(12) United States Patent
Liao et al.

(10) Patent No.: US 9,049,134 B2
(45) Date of Patent: Jun. 2, 2015

(54) NETWORK CONDITION PREDICTIONS FOR MULTIMEDIA STREAMING

(71) Applicant: Disney Enterprises, Inc., Burbank, CA (US)

(72) Inventors: Kevin Liao, Rancho Palos Verdes, CA (US); Jared McPhillen, Glendale, CA (US); Mark Arana, West Hills, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 243 days.

(21) Appl. No.: 13/791,752

(22) Filed: Mar. 8, 2013

(65) Prior Publication Data
US 2014/0258505 A1   Sep. 11, 2014

(51) Int. Cl.
| | | |
|---|---|---|
| G06F 15/173 | (2006.01) | |
| H04Q 7/38 | (2006.01) | |
| H04L 12/24 | (2006.01) | |
| G06F 17/30 | (2006.01) | |
| H04L 29/06 | (2006.01) | |
| H04N 21/00 | (2011.01) | |
| H04W 64/00 | (2009.01) | |
| H04N 21/24 | (2011.01) | |
| H04N 21/258 | (2011.01) | |
| H04L 29/08 | (2006.01) | |
| H04W 4/02 | (2009.01) | |

(52) U.S. Cl.
CPC ............ *H04L 41/142* (2013.01); *H04L 41/147* (2013.01); *H04L 67/22* (2013.01); *G06F 17/30* (2013.01); *H04L 65/00* (2013.01); *H04N 21/00* (2013.01); *H04W 4/02* (2013.01); *H04W 4/028* (2013.01); *H04W 64/00* (2013.01); *H04L 67/18* (2013.01); *H04N 21/2402* (2013.01); *H04N 21/25841* (2013.01)

(58) Field of Classification Search
CPC ................... H04N 21/44222; H04N 21/4532; G06Q 30/02; G06F 3/048
See application file for complete search history.

(56) References Cited

U.S. PATENT DOCUMENTS

| | | | |
|---|---|---|---|
| 7,391,786 B1* | 6/2008 | Prasad et al. ................... | 370/412 |
| 2002/0032772 A1* | 3/2002 | Olstad et al. ................... | 709/224 |
| 2003/0129992 A1* | 7/2003 | Koorapaty et al. ............ | 455/456 |
| 2011/0093605 A1* | 4/2011 | Choudhury et al. .......... | 709/231 |

OTHER PUBLICATIONS

Haakon Riiser et al., "Video Streaming Using a Location-based Bandwidth-Lookup Service for Bitrate Planning", ACM Transactions on Multimedia Computing, Communications and Applications, 2011, pp. 1-24, vol. 0, No. 0, Article 0, New York, NY, USA.

(Continued)

*Primary Examiner* — Peling Shaw
(74) *Attorney, Agent, or Firm* — Sheppard, Mullin, Richter & Hampton LLP

(57) ABSTRACT

Network condition prediction and multimedia streaming consumption prediction are provided. The prediction may be based on a device's prior location, behavior, and statistics thereof. By gathering location data from users anonymously and securely, a virtual location network with millions of nodes are provided. Each virtual location, at a given time, is stored with associated network metrics gathered from various devices in a database. The database may comprise a probabilistic model and a behavioral model tracking device metrics.

24 Claims, 9 Drawing Sheets

(56) References Cited

OTHER PUBLICATIONS

Paolo Bellavista et al., "Mobile Proxies for Proactive Buffering in Wireless Internet Multimedia Streaming", Dip. Elettronica, Informatica e Sistemistica—Universita di Bologna, pp. 1-8, Bologna, Italy, *Distributed Computing Systems Workshops, 2005. 25th IEEE International Conference,* Jun. 6-10, 2005.

Paolo Bellavista et al., "Adaptive Buffering-based on Handoff Prediction for Wireless Internet Continuous Services", Dip. Elettronica, Informatica e Sistemistica—Universita di Bologna, pp. 1-12, Bologna, Italy. Sep. 23, 2005.

Mei-Hsuan Lu et al., "CMUseum: A Location-aware Wireless Video Streaming System", Electrical and Computer Engineering Department Carnegie Mellon University, ICME, 2006, pp. 2129-2132.

\* cited by examiner

NETWORK CONDITION PREDICTIONS FOR MULTIMEDIA STREAMING

TECHNICAL FIELD

The present application relates generally to multimedia streaming, more particularly, some embodiments relate to network conditions prediction and multimedia streaming consumption prediction.

DESCRIPTION OF THE RELATED ART

Driven by advances in computer networking and communication technologies, multimedia streaming has become an integrated part of people's lives. A provider delivers or streams media constantly to a user. Generally, multimedia content has a large volume, which may cause significant transmission costs. Further, the speed of streaming is impacted by network conditions.

BRIEF SUMMARY OF THE APPLICATION

According to various embodiments of the application, a method of predicting network conditions for multimedia streaming securely and anonymously is provided. In various embodiments, a virtual network perceives and stores network metrics associated with each network node. The virtual network may comprise millions of nodes. In one embodiment, rather than translating to actual physical GPS locations, each node may represent a virtual location determined by hashing a physical GPS location. A relational database, which comprises a probabilistic model, may be constructed from the virtual network and historical data. The virtual location for a device at a future point in time, may be predicted using the relational database. As such, network conditions for the device at the future time point may be predicted.

According to various embodiments of the application, a method of predictive multimedia streaming consumption is provided. A behavioral model tracks device metrics, such as the network signature of devices, physical properties of devices, and end user behavior. Future multimedia streaming behavior of the device may be predicted based on the behavioral model. In various embodiments, the method may determine minimum network condition for uninterrupted multimedia streaming onto the device. The method may pre-buffer a determined amount of multimedia content to the device upon determining that the predicted network condition is less than the minimum network condition. In one embodiment, the method may pre-buffer the multimedia content accordingly.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

Figure 1:
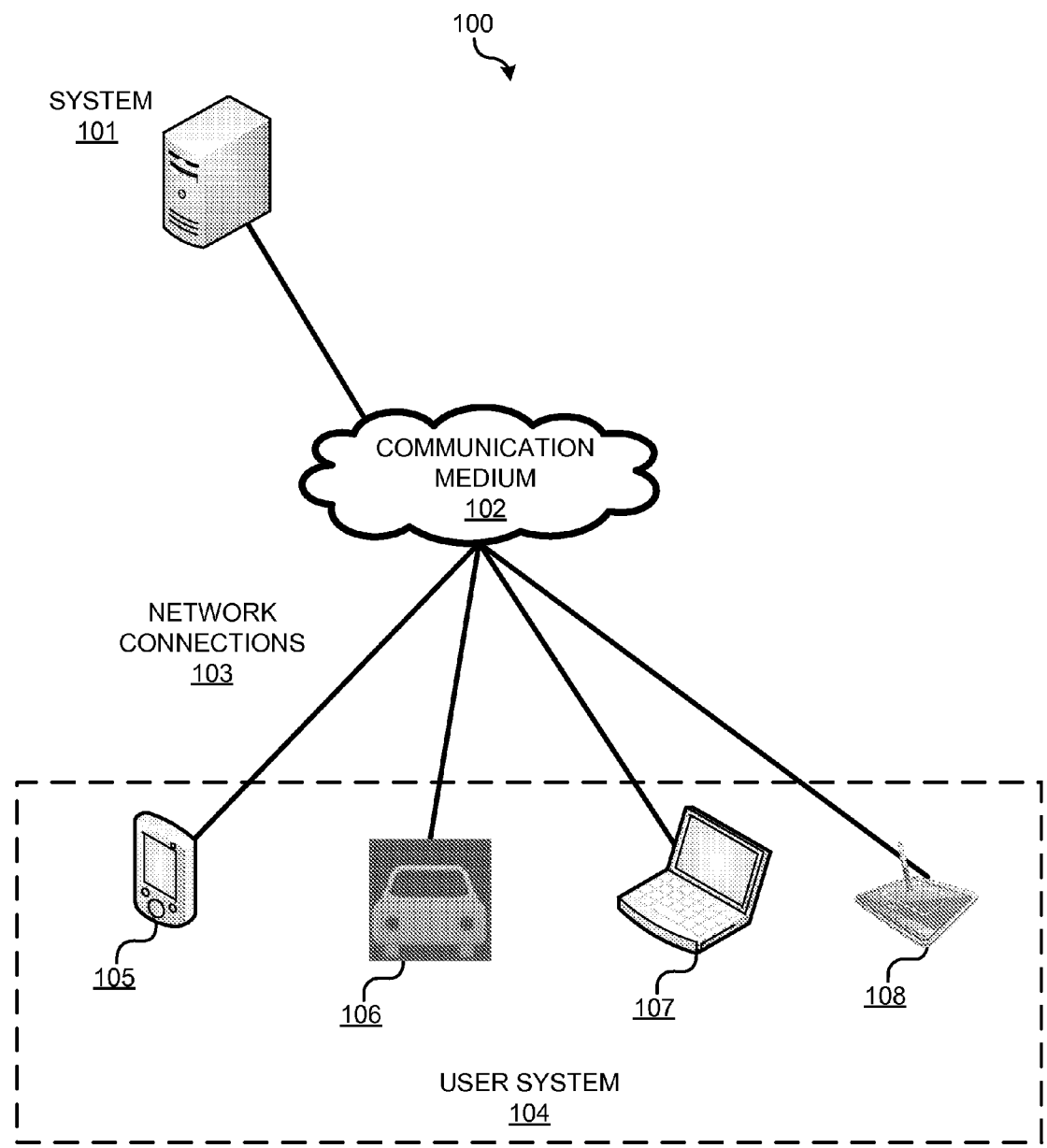
FIG. 1 illustrates an exemplary environment in which an embodiment may be implemented.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Multimedia streaming can be impaired because 1) a communication network (for example, the Internet or a wireless network) is shared among various users, and congestions may happen on busy nodes of the communication network; 2) bandwidth available to a user may change dramatically when the user moves between different network end-points (for example, cell tower handoff, Wi-Fi access point switching, etc); or 3) packets sent across the communication network are not guaranteed and are only delivered with "best effort." These problems may interrupt multimedia streaming and need to be resolved to provide the best user experience in multimedia streaming without interruption.

Changes in network topology, network bandwidth, device capacity, device performance, and many other network metrics or device metrics affect the multimedia streaming experience significantly. Beyond the ability to react to changes in the device that receives streamed multimedia, proactively predicting a device's future network condition and multimedia streaming consumption in real-time may further improve multimedia streaming efficiency and achieve cost savings. Streaming quality and performance may be improved, and less wasted bandwidth and dropped packets may be achieved.

The present application is directed toward network condition prediction and multimedia streaming consumption prediction. In various embodiments, the prediction may be based on a device's current and/or prior location, behavior, and statistics thereof. By gathering location data from users anonymously and securely, one embodiment provides a virtual location network with millions of nodes. Each node represents a virtual location which may correspond to a GPS location, but cannot be mapped back to the actual GPS location. In further embodiments, at a given time, the system stores the virtual location and perceived average network metrics for the virtual location in a database. In various embodiments, the database may comprise a probabilistic model. In one embodiment, a device's corresponding database entry may comprise a set of pointers pointing to a set of possible future virtual locations for the device at a future time point.

Additionally, various embodiments may comprise a behavioral model of the streaming devices. The behavioral model may comprise device metrics such as network signature of a device, physical properties of the device, and end user behavior. Network signature of a device may comprise the MAC address, the IP (Internet Protocol) address, the bandwidth capability, and the observed past performance of the device or the specific brand and model of the device. Physical properties of the device may comprise the display resolution, the stream format capability, and the observed physical location change patterns. End user behavior may comprise a percent of content streamed before a manual interruption, a tendency to scrub (play content in a non-linear fashion such as skipping, and fast-forwarding) or trickplay (playback content in a non-linear fashion such as skipping, and fast-forwarding.) content, a tendency to finish long-duration (e.g., 30-minutes or more) content, a tendency to manually switch stream qualities, actions related to audio tracks, and actions related to captioning tracks.

Before describing the application in detail, it is useful to describe an example environment in which the application can be implemented. One such example is illustrated in FIG. 1.

FIG. 1 illustrates an exemplary multimedia streaming prediction system 101 implemented in an environment 100 comprising various user devices 105-108, which may be collectively referred to as a user system 104 connected via a communication medium 102. The multimedia streaming prediction system 101 may provide multimedia streaming services, and users may request various streamed multimedia content from the multimedia streaming prediction system 101 by using various user devices 105-108. In another embodiment, the multimedia streaming prediction system 101 may provide prediction services to a multimedia streaming service system (not shown), from which users stream multimedia content. In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, user system 104 may comprise a smartphone 105 (e.g., iPhone®), a vehicle 106 (e.g., a car), a laptop computer 107, and/or a tablet 108 (e.g., iPad®), through their respective network connections 103, can either interact directly or indirectly with the multimedia streaming prediction system 101. For example, a network connection 103 may include wired connections (e.g., Digital Subscriber Line (DSL), optical) and/or wireless connections (e.g., Wi-Fi.) In various embodiments, a network connection 130 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 103 need not necessarily be the same throughout the environment 100. For example, as a smartphone moves throughout the environment, it could move from a WiFi network to a cellular data network, and could further move between various cells in a cellular data network. Various user devices 105, 106, 107, and 108 and the multimedia streaming prediction system 101 described herein may be implemented using the example computer system illustrated in FIG. 5.

A platform to stream various multimedia files may be hosted by the multimedia streaming prediction system 101, which may be accessed by a user using any user device 105, 106, 107, or 108. In various embodiments, a user may access, stream, purchase, upload, or distribute a multimedia via a user system 104. The user system 104 can display any interface related to the multimedia streaming prediction system 101. For example, the user system 104 may be configured to receive a multimedia streaming input (or request) from a user, to transmit the multimedia streaming input to the multimedia streaming prediction system 101, and to receive streamed multimedia content from the multimedia streaming prediction system 101. In one embodiment, a user may download a client component of a multimedia streaming system such as a multimedia streaming application. The client component may be executed locally at a user system 104, whereas the multimedia streaming prediction system 101 may provide back-end support for the client component and may be responsible for maintaining the multimedia files, processing inputs from users, predicting network conditions, gathering user data, streaming multimedia content, and transmitting instructions to various user devices 105-108 of the user system 104.

Figure 2:
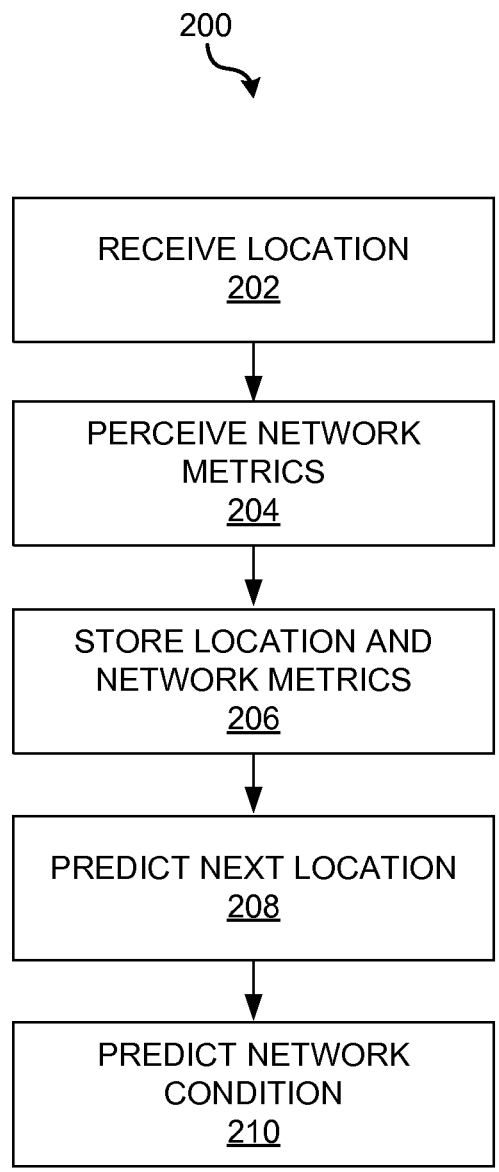
FIG. 2 is a flow diagram illustrating an exemplary method of predicting network conditions, such as for the system illustrated in FIG. 1.

FIG. 2 is a flow diagram illustrating an exemplary method 200 of predicting network conditions, such as for the environment 100 in FIG. 1. At step 202, the method receives a location from a device (such as one of the user devices 105-108). In various embodiments, this location may be a virtual location. In some embodiments, a virtual location may be a hashed value so that it does not translate to the actual location of the device. In one embodiment, the actual location of the device is the actual GPS location which comprises a latitude and longitude pair, rounded to a specific resolution such as the nearest minute or other significant digit. The specific resolution may be a concatenated value. For example, the current latitude (for example, to the nearest minute) may be concatenated with the current longitude (also to the nearest minute, for example). In some embodiments, the concatenated value may be hashed, and the hashed value treated as a virtual location. For example, a one-way function that uses a cryptographic hash function may be used to hash the concatenated value: the input of the one-way function is the concatenated value, and the output of the one-way function is the virtual location. Further, a salt, which may be a randomly generated element may be used to augment the hashing process. For example, for a one-way hashing function, the inputs may be the concatenated value and a salt, and the output is the encrypted value, that is, the virtual location. In one embodiment, a client component installed on the device may gather the actual location data, generate the virtual location, and transmit the virtual location via a mutually authenticated secure channel to a multimedia streaming prediction server 101. In various embodiments, the method may only use a salt for a time period and replace the salt with a new salt. As such, the virtual location to which a physical location corresponds will be replaced by a new, unique virtual location.

At step 204, the method perceives a set of network metrics associated with the virtual location, such as the network bandwidth, the network latency, the network jitter, etc. In one embodiment, the method gathers the network metrics from a device. In various embodiments, many different actual locations may map to a particular virtual location. For example, in one embodiment, the actual location is rounded to the nearest GPS minutes. A GPS minute is approximately 1.15 miles, so the area that is rounded is approximately 1.32 square miles. At any time, a virtual location corresponds to a 1.32-square-mile physical area, and there may be more than one device in that physical area. Accordingly, at any time, more than one set of network metrics may be perceived from the devices in the physical area corresponding to the same virtual location. For a time point, a set of average network metrics associated with the virtual location may be determined by averaging the network metrics perceived.

Subsequently, at step 206, the method stores the virtual location and the associated network metrics observed at a given time. In one embodiment, the method stores the virtual location, the associated network metrics, and the time as a database entry in a database. In further embodiments, snapshots of the database entries may be segmented to a specific time interval that can be used for prediction during different time periods. For example, database entries for a virtual location may be segmented to the time at 8 AM of every Tuesday for predicting network metrics at 8 AM of a future Tuesday for this virtual location. In further embodiments, the method may analyze the database entries to provide statistics of the network condition of a virtual location and use the statistics to predict future network conditions of the virtual location.

At step 208, the method may predict a device's next possible virtual location. In one embodiment, the database may be a relational database and may comprise millions of database entries. These millions of database entries may be connected. For example, a database entry that corresponds to a device may comprise a set of pointers pointing to the possible next virtual locations for the device at a next time point. In various embodiments, the database may comprise a probability model, such as a Markov Chain describing the likelihood of movement of a device from a virtual location to another virtual location. In one embodiment, the database may comprise transition or state probability Markov Chains that are constantly evolving. A node of a Markov Chain may represent a state, which may correspond to a virtual location. A transition of a Markov Chain may represent a probability of a particular device moving from a first virtual location to a second virtual location from a time point to the next time point. As various embodiments store the virtual location with the associated average network metrics for a given time, a node of a Markov Chain may be mapped to the average network metrics that are associated with the virtual location to which the node corresponds.

At step 210, the method predicts the network condition for a particular device at the next time point. In one embodiment, the method may determine that the next virtual location is the possible virtual location having the highest probability, and the network metrics associated with this virtual location at the current time point are the network condition for the device at the next time point. In another embodiment, the method may predict that the network condition for the device at the next time point is the sum of the weighted network metrics associated with all possible virtual locations for the device at the next time point. In one embodiment, the weight for a possible virtual location is the probability of the device moving to this virtual location.

Figure 3:
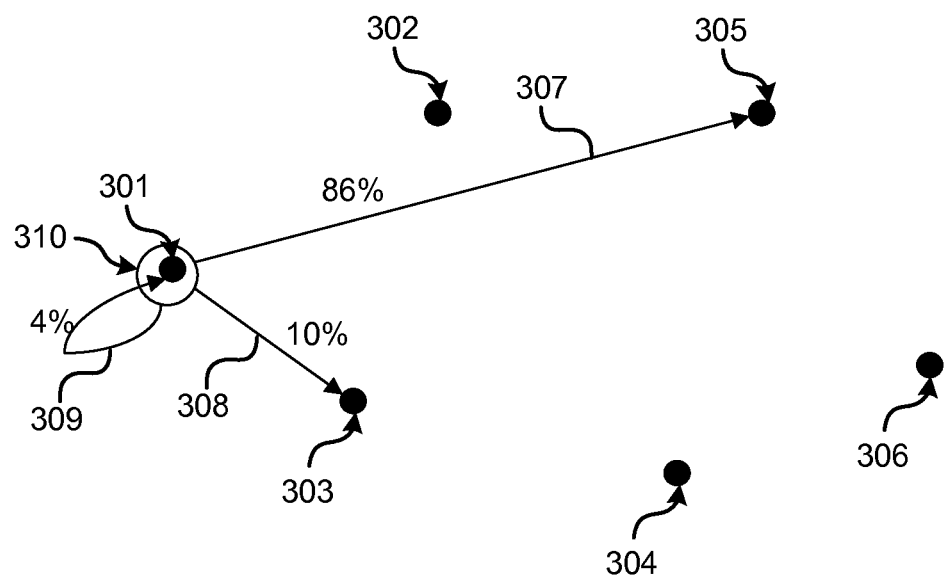
FIG. 3 is a diagram illustrating exemplary network condition prediction for a device, such as one of the user devices illustrated in FIG. 1.

FIG. 3 is a diagram illustrating exemplary network condition prediction for a device 310, such as one of the user devices 105-108 in FIG. 1. In the illustrated example, there are virtual locations 301-306, and the device 310 is at virtual location 301. The virtual location 301 is the output of a one-way function, and so it is impossible to map directly back to the actual GPS location of a device. Accordingly, the method gathers the location data anonymously and securely. The database (not shown) corresponding to the illustrated example may comprise probability models such as a Markov Chain. A device's corresponding database entry may comprise a pointer pointing to a virtual location for the device 310 at a next time point. As such, some of the database entries may be connected by various pointers, and the database may be a relational database.

For example, as illustrated, at a given time point T1, the device 310 is at the virtual location 301. The pointer or graph edge 307, starts from virtual location 301 and terminates at virtual location 305, showing that the device 310 has an 86% chance of moving from virtual location 301 to virtual location 305 from time T1 to time T2. The pointer 308 starts from virtual location 301 and terminates at virtual location 303, showing that the device 310 has a 10% chance of moving from virtual location 301 to virtual location 303 from time T1 to time T2. The pointer 309 starts from the virtual location 301 and terminates at the same virtual location 301, showing that the device 310 has a chance of 4% of staying at the virtual location 301 from time T1 to time T2.

Each of the virtual locations 301-306 has associated average network metrics (not shown) stored in the database. As illustrated, at time T2, there is an 86% chance that the device 310 will be at virtual location 305, a 10% chance at virtual location 303, and a 4% chance at virtual location 301. The method may predict that the device 310 is more likely to be at the virtual location 305 and predict that the network condition for the device 310 at T2 are the observed network metrics associated with the virtual location 305 collected at T1. In another embodiment, the method may predict that the network condition for the device 310 at T2 based on the historical network metrics (for example, historical network metrics that have the same time, day of a week, date, and/or events as T2) associated with the virtual location 305. In another embodiment, the method may predict that the network condition for the device 310 at T2 is the weighted average network metrics associated with the virtual locations 301, 303, and 305 collected at T1. In another embodiment, a weighted-minimum of the network metrics associated with virtual locations 301, 303, and 305 may be used for a more aggressive algorithm in predicting lowest-possible network condition.

Figure 4:
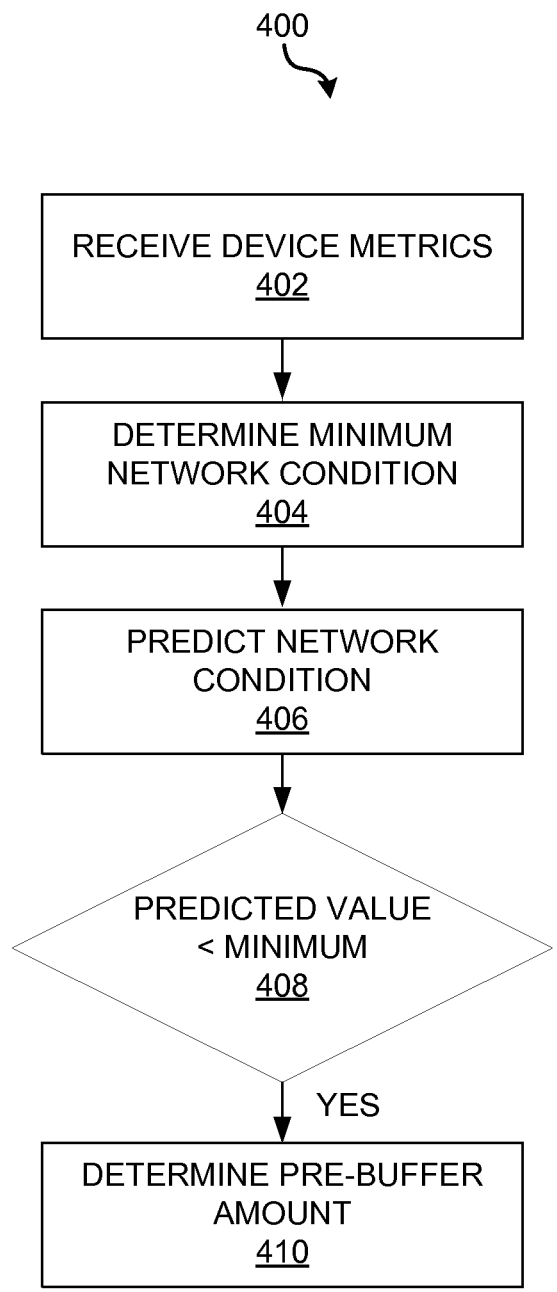
FIG. 4 is a flow diagram illustrating an exemplary method of predicting network conditions, such as for the system illustrated in FIG. 1.

FIG. 4 is a flow diagram illustrating an exemplary method 400 of predicting network conditions, such as in the environment 100 in FIG. 1. In various embodiments, the method may create, store, and maintain a behavioral model that tracks the device's metrics. In one embodiment, the method may analyze the device's metrics and provide statistics of the device's metrics. At step 402, the method may receive device metrics from the device (such as one of the user devices 105-108 in FIG. 1). The device metrics may comprise the network signatures of the device. For example, the MAC address, the IP address, the bandwidth capacity, the observed past performance of the device. The device metrics may also comprise the physical properties of the device, such as the display resolution, the stream format capability, the observed physical location change patterns, and other factors. In further embodiments, the device metrics may comprise a user's behavior, such as the percent of content streamed before the user's manual interruption, the tendency to scrub content, the tendency to finish the long-form content, the tendency to manually switch stream qualities, actions related to the audio tracks, and actions related to the captioning tracks. In various embodiments, the method may store the device metrics received by associating the device metrics with the time record for the device. As such, the method updates the behavioral database and the behavioral model.

At step 404, the method determines the minimum network condition for the device. The minimum network condition is the network condition necessary for the device or the user to continue the multimedia streaming without interruption. In various embodiments, the method may determine the minimum network condition by analyzing various factors such as the device's metrics, the statistics of the device's metrics, and the multimedia content being streamed to the device. At step 406, the method predicts the network condition for the device at the next time point. The method may predict the network condition for the device based on a prediction of the device's future location as illustrated in FIG. 2. At step 408, the method may determine whether the predicted future network condition is less than the minimum network condition for maintaining the multimedia streaming without interruption. Upon determining that the predicted network condition is less than the minimum network condition required for the continuous multimedia streaming without interruption, at step 410, the method may determine an amount and/or rate of the multimedia content that needs to be sent to the user device and pre-buffered at the user device so that the user may experience an uninterrupted multimedia streaming at the next time point. Various parameters may be analyzed such as the device's speed, the multimedia content being streamed to the device, the predicted network condition, the device's metrics, and the statistics of the device's metrics. In various embodiments, the method pre-buffers an amount of the multimedia content at the device at step 410.

Figure 5A:
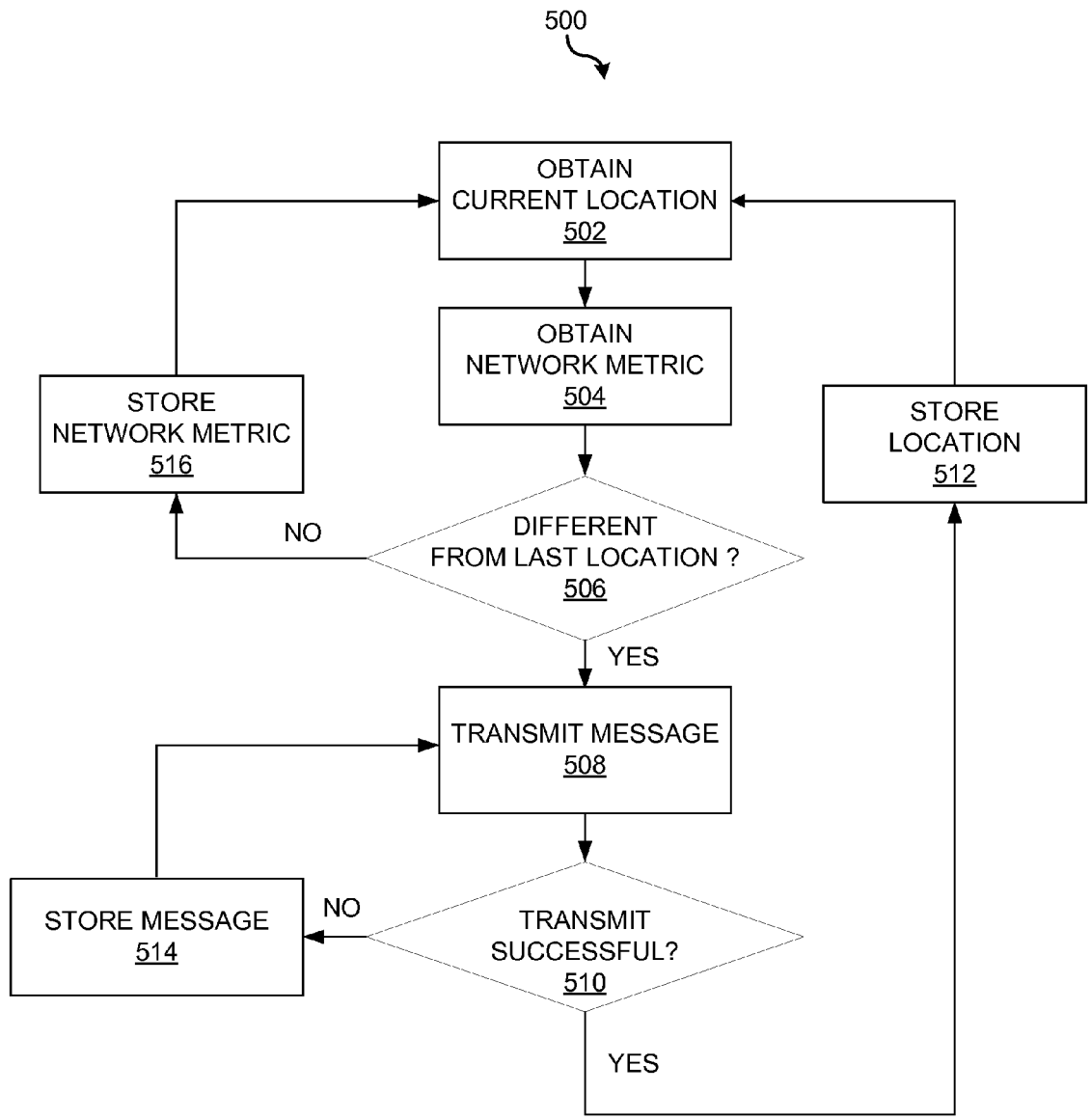
FIG. 5A is a flow diagram illustrating an exemplary method of a device (such as various user devices illustrated in FIG. 1) creating a virtual network.

FIG. 5A is a flow diagram illustrating an exemplary method 500 of a device (such as various user devices 105-108 in FIG. 1) creating a virtual network. In the illustrated example, at step 502, the method 500 obtains the current location of a device at a time point. In one embodiment, the current GPS location of the device may be collected. At step 504, the method 500 may obtain or update the network metric for the current location. In one embodiment, the method 500 may obtain the average network metric. The method may further determine a virtual location corresponding to the current location by rounding and/or hashing the current location.

Subsequently, the method 500 evaluates whether the current location is different from the last location that is obtained at a previous time point. The method 500 may compare the locations as obtained or compare the virtual locations corresponding to the obtained locations. The method 500 may proceed to step 516 upon determining that the current location is the same as the last location. At step 516, the method 500 may store the network metric obtained.

At step 506, the method 500 may proceed to step 508 upon determining that the current location is different from the last location. At step 508, the method 500 may transmit a message comprising the virtual location and metadata (such as network metrics, statistical information, etc) associated with the virtual location, the previous message, as well as the network metric for the current location. In various embodiments, the new message and/or the previous message may be hashed. The method 500 may transmit the messages to a network prediction system (such as the multimedia streaming prediction system 101 in FIG. 1). If the transmission is determined to be successful at step 510, then the method 500 proceeds to step 512, where the method 500 stores the current location as the last location for the next time point. If the transmission is determined to be unsuccessful at step 510, then the method 500 proceeds to step 514, where the method 500 stores the current for future transmission. For example, when the connectivity is restored.

Figure 5B:
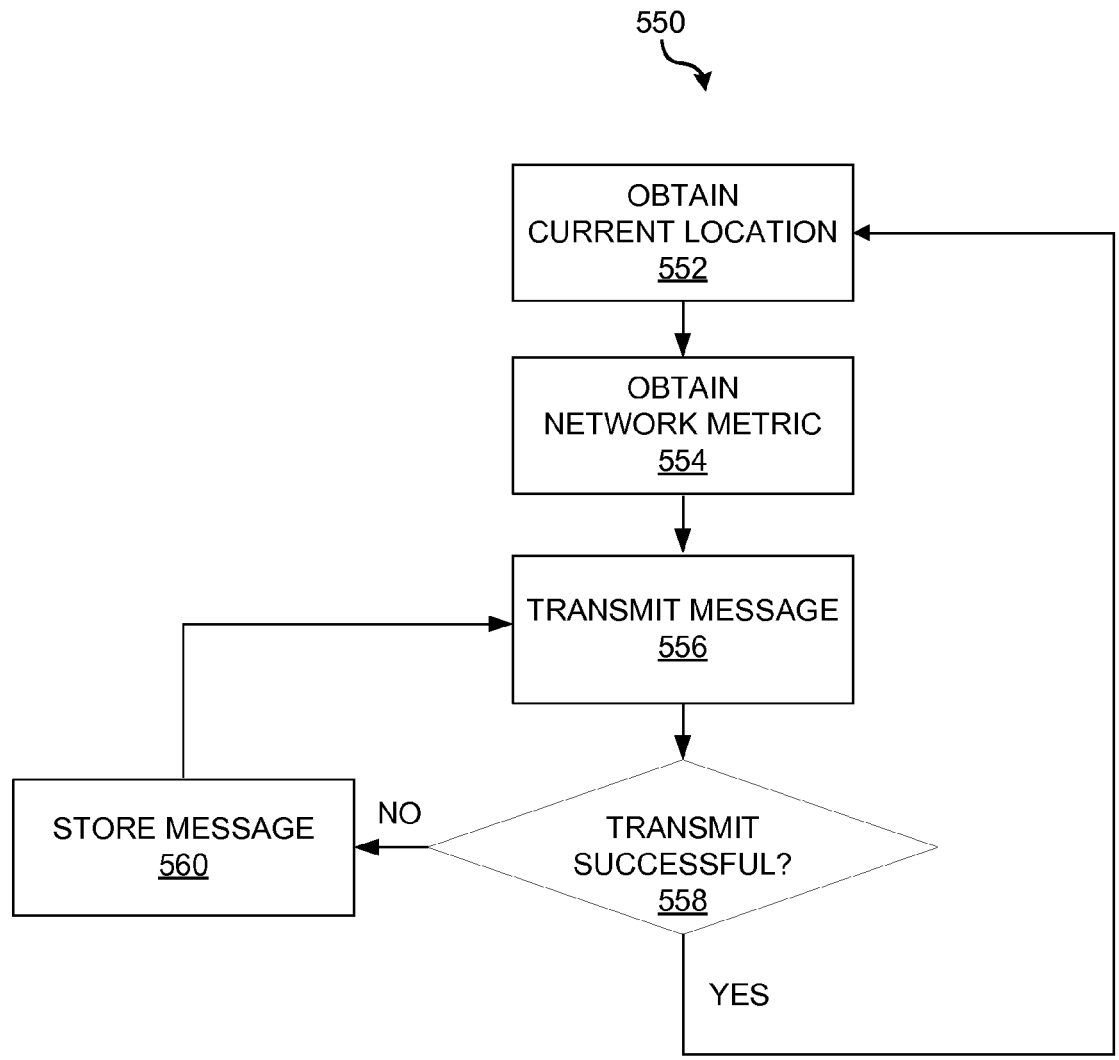
FIG. 5B is a flow diagram illustrating an exemplary method of a device (such as various user devices illustrated in FIG. 1) creating a virtual network.

FIG. 5B is a flow diagram illustrating an exemplary method 550 of a device (such as various user devices 105-108 in FIG. 1) creating a virtual network. In the illustrated example, at step 552, the method 550 obtains the current location of a device at a time point. In one embodiment, the current GPS location of the device may be collected. At step 554, the method 550 may obtain or update the network metric for the current location. In one embodiment, the method 550 may obtain the average network metric. The method may further determine a virtual location corresponding to the current location by rounding and/or hashing the current location.

At step 556, the method 550 may transmit a new message comprising the virtual location and metadata (such as network metrics, statistical information, etc) associated with the virtual location, the previous message, as well as the network metric for the current location. In various embodiments, the new message and/or the previous message may be hashed. The method 550 may transmit the messages and the network metric to a network prediction system (such as the multimedia streaming prediction system 101 in FIG. 1). If the transmission is determined to be unsuccessful at step 558, then the method 550 proceeds to step 560, where the method 550 stores the current for future transmission. For example, when the connectivity is restored. If the transmission is determined to be successful at step 558, then the method 550 proceeds to step 552 where the steps are repeated for the next time point.

Figure 6A:
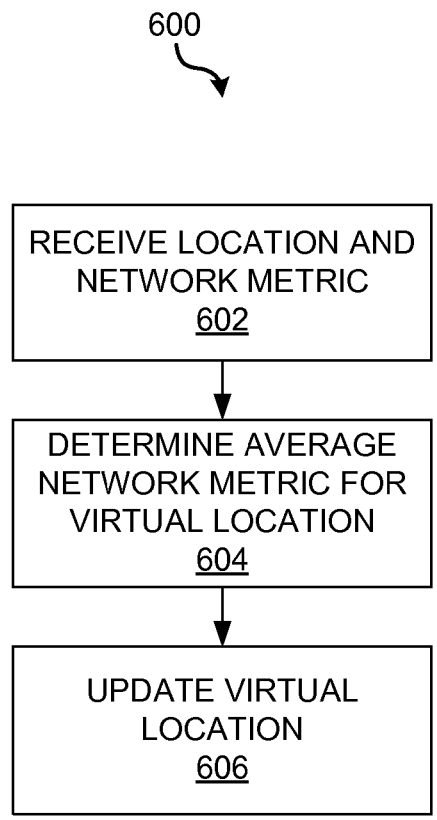
FIG. 6A is a flow diagram illustrating an exemplary method of a network prediction system (such as the multimedia streaming prediction system illustrated in FIG. 1) creating a virtual network.

FIG. 6A is a flow diagram illustrating an exemplary method 600 of a network prediction system (such as the multimedia streaming prediction system 101 in FIG. 1) creating a virtual network. At step 602, the method 600 receives from a device (such as various user devices 105-108 in FIG. 1) the last virtual location at a previous time point, the current virtual location at the current time point, and the associated network metric for each virtual location. At step 604, the method 600 may determine and store the average network metric for a virtual location (e.g., the current virtual location at the current time point for the device). The method 600 may calculate the average network metric for the virtual location by using the network metrics collected from all the devices that are in the area that corresponds to the virtual location at the current time point. At step 606, the method 600 updates the last virtual location's probability to move to current virtual location in a probabilistic model. In one embodiment, the probabilistic model may comprise a predetermined number of records for each virtual location.

Figure 6B:
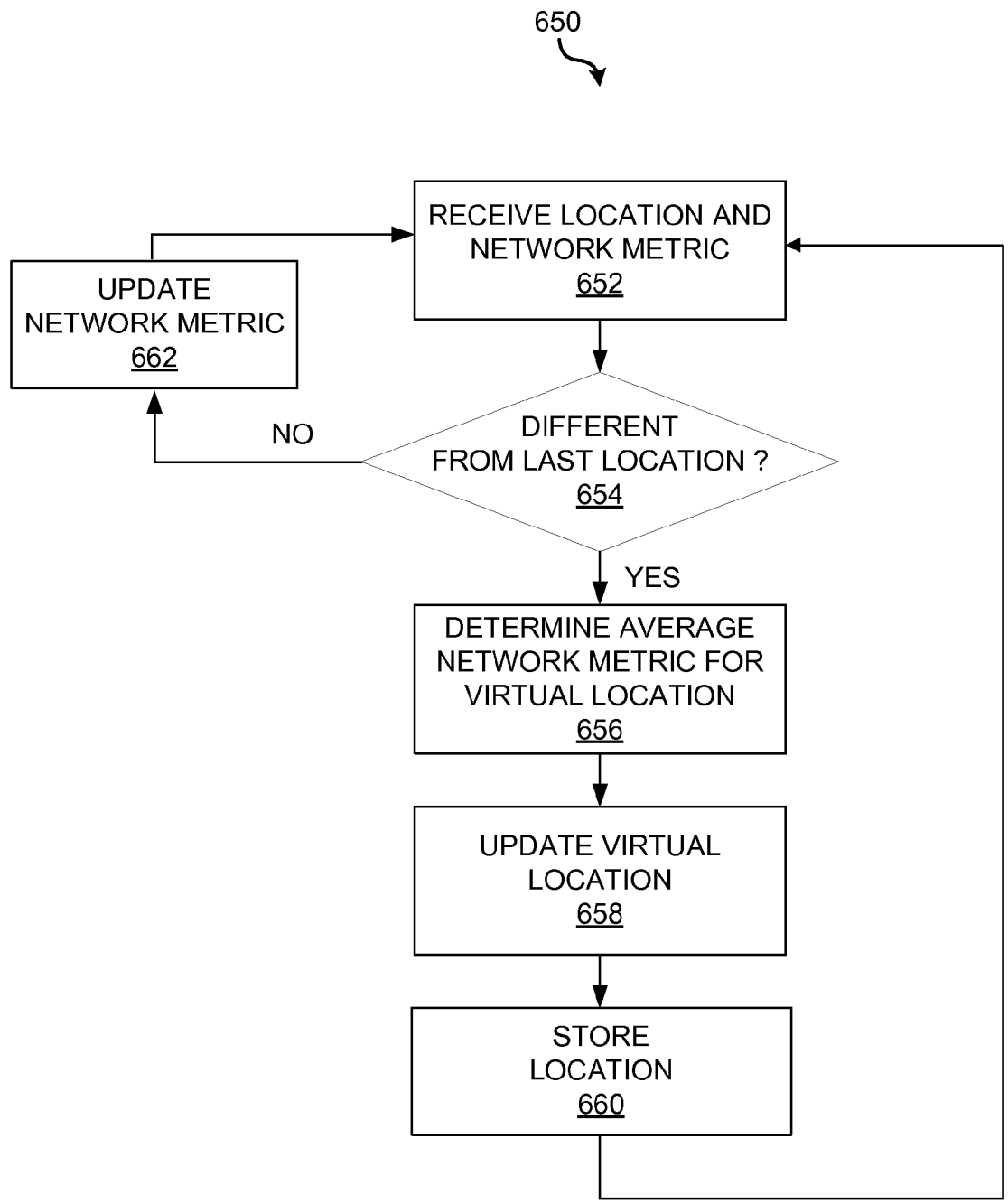
FIG. 6B is a flow diagram illustrating an exemplary method of a network prediction system (such as the multimedia streaming prediction system illustrated in FIG. 1) creating a virtual network.

FIG. 6B is a flow diagram illustrating an exemplary method 650 of a network prediction system (such as the multimedia streaming prediction system 101 in FIG. 1) creating a virtual network. At step 652, the method 650 receives from a device (such as various user devices 105-108 in FIG. 1) the last virtual location at a previous time point, the current virtual location at the current time point, and the associated network metric for each virtual location. Subsequently, at step 654, the method 650 evaluates whether the current virtual location is different from the last virtual location that is obtained at a previous time point.

The method 650 may proceed to step 656 upon determining that the current location is the same as the last location. At step 656, the method 650 may determine and store the average network metric for a virtual location (e.g., the current virtual location at the current time point for the device). The method 650 may calculate the average network metric for the virtual location by using the network metrics collected from all the devices that are in the area that corresponds to the virtual location at the current time point. The method 650 may proceed from step 654 to step 656 upon determining that the current location is different from the last location. At step 656, the method 650 may determine and update the average network metric for the current virtual location. The method 650 may calculate the average network metric for the virtual location by using the network metrics collected from all the devices that are in the area that corresponds to the virtual location at the current time point.

The method 650 updates the last virtual location's probability to move to current virtual location in a probabilistic model at step 658 and stores the current virtual location as the last virtual location for the next time point. In one embodiment, the probabilistic model may comprise a predetermined number of records for each virtual location.

Figure 7:
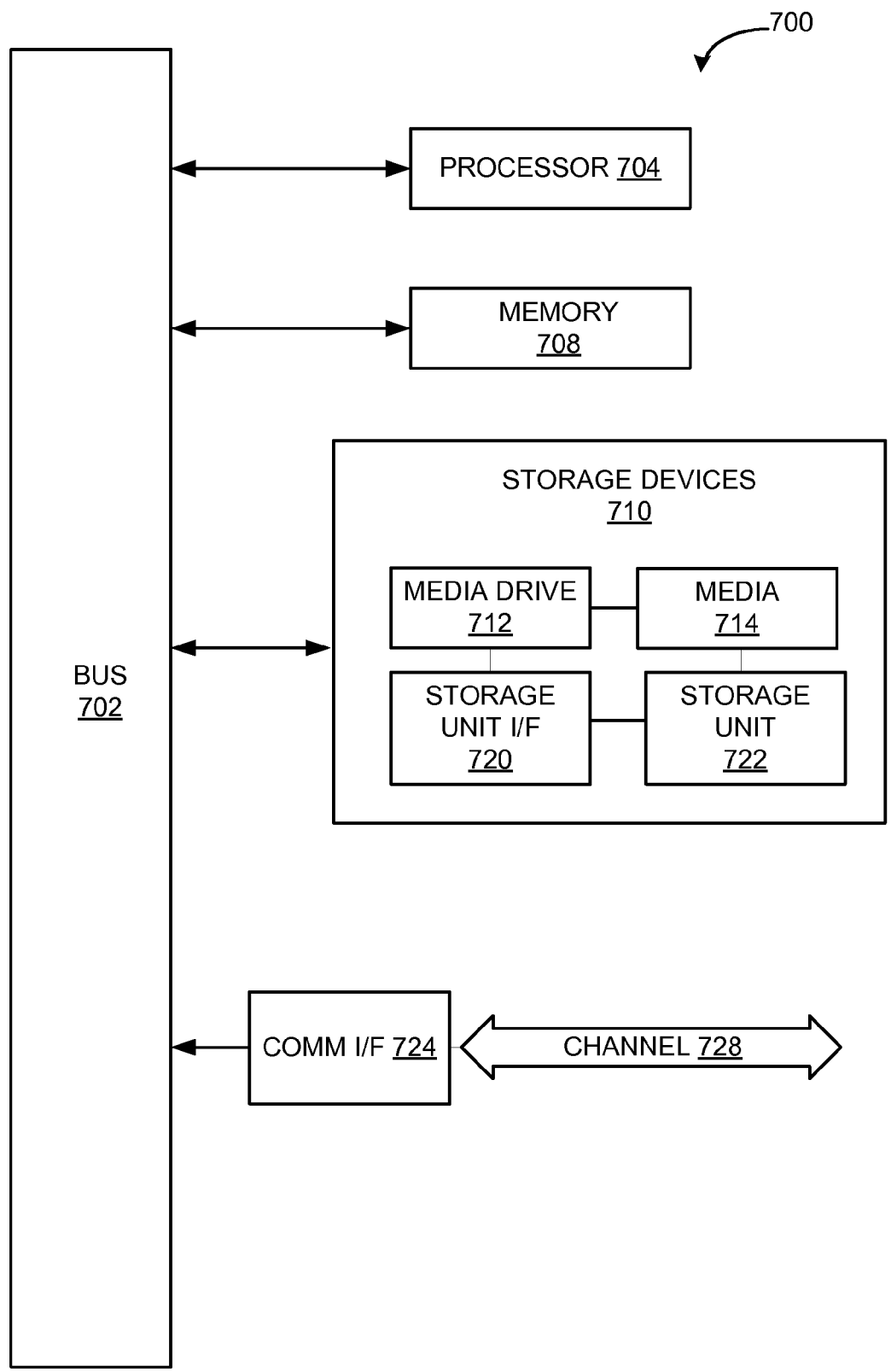
FIG. 7 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, interface 720, storage media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of predicting network conditions for multimedia streaming, comprising:
    receiving a first location value corresponding to a position from a device at a time point;
    obtaining a set of network metrics associated with the first location value at the time point; and
    storing the first location value and the network metrics in a database, wherein the database is a relational database and comprises a probability model describing a likelihood of the device moving from the first location to a second location.

2. The computer-implemented method of claim 1, further comprising determining a second set of network metrics for the device at the next time point.

3. The computer-implemented method of claim 2, wherein if the second set of network bandwidth metrics is below a predetermined value, further comprising determining an amount of streamed multimedia content to be pre-buffered to the device.

4. The computer-implemented method of claim 1, wherein the database comprises a behavioral model comprising device metrics of all devices within the system.

5. The computer-implemented method of claim 1, wherein the first location is an output of a one-way function and the GPS position is an input of the one-way function.

6. The computer-implemented method of claim 5, wherein the one-way function uses a cryptographic hash function having a second input, the second input being a salt.

7. The computer-implemented method of claim 1, wherein the set of network metrics comprise a bandwidth, a latency, or a jitter.

8. The computer-implemented method of claim 1, wherein the database comprises a set of entries, each entry comprising a set of pointers, wherein each pointer points to a third location with a probability, the third virtual location being a possible virtual location for the device at a next time point.

9. The computer-implemented method of claim 1, wherein the database comprises a behavioral model, further comprising updating the behavioral model having a set of device metrics comprising a network signature of the device at the time point, a set of physical properties of the device at the time point, and a user behavior of the device at the time point.

10. The computer-implemented method of claim 1, wherein the network signature of the device comprises a MAC address, an IP address, a bandwidth capability, or an observed past performance of the device.

11. The computer-implemented method of claim 1, wherein the set of physical properties comprises a display resolution, a stream format capability, or an observed physical location change pattern.

12. The computer-implemented method of claim 1, wherein the end user behavior comprises a percent of a content streamed prior to a manual interruption, a tendency to scrub content, a tendency to finish long-form content, a tendency to manually switch stream qualities, actions related to an audio track, or actions related to a captioning track.

13. A non-transitory computer readable medium having computer executable program code embodied thereon, the computer executable program code configured to cause a computing device to:
receive a first location value corresponding to a position from a device at a first time point;
perceive a set of network metrics associated with the first location value at the time point; and
store the first location value and the network metrics in a database, wherein the database is a relational database and comprises a probability model describing a likelihood of moving from the first location to a second location.

14. The computer readable medium of claim 13, wherein the computer executable program code is further configured to cause the computing device to determine a second set of network metrics for the device at the next time point.

15. The computer readable medium of claim 14, wherein the second set of network bandwidth metrics is below a predetermined value, and wherein the computer executable program code is further configured to cause the computing device to determine an amount of multimedia streaming to be pre-buffered to the device.

16. The computer readable medium of claim 13, wherein the database comprises a behavioral model comprising device metrics of the device.

17. The computer readable medium of claim 13, wherein the first location is an output of a one-way function and the GPS position is an input of the one-way function.

18. The computer readable medium of claim 17, wherein the one-way function uses a cryptographic hash function having a second input, the second input being a salt.

19. The computer readable medium of claim 13, wherein the set of network metrics comprise a bandwidth, a latency, or a jitter.

20. The computer readable medium of claim 13, wherein the database comprises a set of entries, each entry comprising a set of pointers, wherein each pointer points to a third location with a probability, the third virtual location being a possible virtual location for the device at a next time point.

21. The computer readable medium of claim 13, wherein the database comprises a behavioral model, further comprising updating the behavioral model having a set of device metrics comprising a network signature of the device at the time point, a set of physical properties of the device at the time point, and a user behavior of the device at the time point.

22. The computer readable medium of claim 13, wherein the network signature of the device comprises a MAC address, an IP address, a bandwidth capability, or an observed past performance of the device.

23. The computer readable medium of claim 13, wherein the set of physical properties comprises a display resolution, a stream format capability, or an observed physical location change pattern.

24. The computer readable medium of claim 13, wherein the end user behavior comprises a percent of a content streamed prior to a manual interruption, a tendency to scrub content, a tendency to finish long-form content, a tendency to manually switch stream qualities, actions related to an audio track, or actions related to a captioning track.

* * * * *